United States Patent [19]

Alfenaar

[11] 4,294,892
[45] Oct. 13, 1981

[54] METHOD FOR THE OPERATION OF A FUEL CELL

[75] Inventor: Marinus Alfenaar, Schinnen, Netherlands

[73] Assignee: Electrochemische Energieconversie, N.V., Mol, Belgium

[21] Appl. No.: 145,843

[22] Filed: May 1, 1980

[30] Foreign Application Priority Data

May 2, 1979 [NL] Netherlands ............... 7903426

[51] Int. Cl.³ .................................. H01M 8/04
[52] U.S. Cl. ........................................... 429/13
[58] Field of Search ..................... 429/13, 22, 23

[56] References Cited

U.S. PATENT DOCUMENTS 3,379,572 4/1968 Gay .................................. 429/13
3,395,045 7/1968 Ruetschi ........................... 429/13
3,395,046 7/1968 Levine et al. ..................... 429/13

FOREIGN PATENT DOCUMENTS 1215630 12/1970 United Kingdom .

Primary Examiner—Donald L. Walton
Attorney, Agent, or Firm—Cushman, Darby & Cushman

[57] ABSTRACT

An improved method for operating a fuel cell employing porous gas diffusion electrodes. The method provides for the regeneration of the electrode by keeping the oxidizing or reducing gas temporarily at a reduced concentration level while substantially maintaining the pressure on the gas in situ of the electrode and while continuing power offtake at least for the period during which the concentration level is reduced.

12 Claims, 2 Drawing Figures

METHOD FOR THE OPERATION OF A FUEL CELL

BACKGROUND OF THE PRESENT INVENTION

The present invention relates to a method for operating a fuel cell with a porous gas diffusion electrode to which an oxidizing or reducing gas is fed. In particular, the electrode is regenerated and/or the fuel cell is put out of service for a prolonged stretch of time.

British Patent Specification No. 1,215,630 describes a method in which the polarization of a gas diffusion electrode is reduced by absorbing liquid electrolyte into the pores of the electrode. To this end gas fed to the fuel cell is temporarily reduced to zero in an abrupt fashion to lower the pressure in the cell in such a way as to cause the electrolyte present in the cell to be drawn into the pores of the porous electrode. Such a process has the disadvantage that the carefully balanced three-phase equilibrium in the pores is disturbed. At the same time, the proper operation of the fuel cell is disturbed, so that after treatment it is not readily restored to the proper stationary working condition. The sudden changes in pressure also constitute a major drawback, particularly if the fuel cells are composed to a battery, as the control and proper functioning of the battery as a whole is seriously hampered in such a case.

SUMMARY OF THE PRESENT INVENTION

The present invention now provides a method which is free of these drawbacks. In the method according to the present invention, the concentration of the oxidizing or reducing gas, calculated as molecular oxygen and hydrogen, respectively, in the gas phase in situ of the electrode in question, is temporarily brought to a reduced level while the overall pressure of the gas phase in situ of this electrode is substantially maintained and power offtake is continued for at least the duration of the period when there is the reduction in the concentration of the oxidizing or reducing gas. By this procedure the terminal voltage of the fuel cell is reduced, by preference, to below 10% of the original value, more in particular, to below 2% of the original value. The method according to the present invention permits the polarization of the porous gas diffusion electrode, which had gradually increased during operation of the fuel cell, to be substantially restored to the orginal level without putting the cell out of service and without the three-phase equilibrium between gas, electrolyte and solid matter within the pores of the porous electrode being disturbed.

According to the present invention, fuel cells are preferably operated at operating pressures between about 10 and about 5000 kilopascal (kPa) although higher or lower operating pressures are not excluded. Operating pressures between about 100 and about 500 kPa are more particularly preferred. Suitable operating temperatures range from about 250–550 K, although higher and lower operating temperatures are, likewise, not excluded. Practicable concentrations of the oxidizing gas, calculated as molecular oxygen, in the normal feed gas are about 5 to about 100 mol%, while the reduced concentration level of the oxidizing gas preferably ranges from about 0 to about 5 mol%. Highly suitable values for the concentration of the oxidizing gas in the normal feed gas are from about 15 to about 100 mol% and for the reduced concentration level of the oxidizing gas from about 0 to about 1 mol%. Suitable concentrations of the reducing gas, calculated as molecular hydrogen, are in the normal feed gas at about 5 to about 100 mol%, while the reduced concentration level of the reducing gas ranges preferably from about 0 to about 5 mol%. Highly suitable values for the concentration of the reducing gas in the normal feed gas are from about 80 to about 100 mol% and for the reduced concentration level of the reducing gas from about 0 to about 1 mol%.

It is possible for the concentration level of the oxidizing or reducing gas in the gas phase in situ of the cathode or anode, respectively, to be reduced without reducing the overall pressure of this gas phase either by replacing the normal feed gas by a feed gas with a reduced concentration level of the oxidizing or reducing gas, respectively, but with the same overall pressure or by wholly or partially shutting off the spent gas discharge on the cathode or anode side, respectively, while proceeding with the power offtake, as a result of which the desired reduced concentration level of the oxidizing or reducing gas will adjust itself automatically.

Suitable feed gases with a normal concentration level of the oxidizing gas are air, oxygen-enriched air, pure oxygen or air diluted with nitrogen. Suitable feed gases with a reduced concentration level of the oxidizing gas are air diluted with nitrogen or another inert gas and inert gasses such as nitrogen or the nobel gases. Suitable feed gases with a normal concentration level of the reducing gas are hydrogen, hydrogen diluted with nitrogen or hydrogen diluted with carbon dioxide. Suitable feed gases with a reduced concentration level of the reducing gas are hydrogen diluted with nitrogen and/or one or more other inert gases, and inert gases such as nitrogen or the noble gases.

According to one embodiment of the method according to the present invention a fuel cell with a porous gas diffusion electrode is operated so that the electrode is regenerated at regular intervals by maintaining the concentration of the oxidizing or reducing gas in the gas phase in situ of the electrode for given periods at the reduced level. Thus, a gas of lower purity than would be required without the application of this purifying method will suffice. Preferably the concentration of the oxidizing or reducing gas is kept at the reduced level for about 1 to about 30 minutes every 10 to 200 hours of service.

The method according to the present invention is also highly suitable to take a fuel cell as described above out of service without injury to the quality of that cell. To this end the normal feed gas of the porous gas diffusion electrode of that cell is substituted by gas substantially free of oxidizing or reducing gas, respectively, such as nitrogen substantially free of oxygen or hydrogen, respectively, without substantially changing the pressure in the gas phase in situ of the electrode, while continuing the power offtake. After a certain lapse of time, the power offtake is stopped and the cell is stored until it is used again. It is also possible for power offtake to be continued until the oxidizing or reducing gas is consumed and power generation comes to a standstill.

The method according to the invention is applicable for fuel cells employing all manner of porous gas diffusion electrodes. A suitable type of porous gas diffusion electrode is a flat electrode comprised at least of a catalytically active layer, which layer contains catalytically active metal, carbon and a polymer bonding agent and is porous to gas and electrolyte with optionally an adjacent gas-permeable but liquid-tight layer. During operation the gas and liquid permeable layer is then in contact with the electrolyte, e.g. sodium or potassium hydroxide solution or a phosphoric acid solution. Suitable types of carbon for these gas diffusion electrodes are graphite, activated carbon, graphitized carbon, etc. Suitable bonding agents are polymeric materials such as polyethylene, polypropylene, polytetrafluoroethylene, polyvinyl chloride. Suitable catalytically active metals are nickel and noble metals such as iridium, rhodium, platinum, palladium, gold and alloys thereof. The porosity of the catalytically active layer can be enhanced by using soluble salts, such as sodium sulphate, sodium carbonate, ammonium carbonate and the like, as pore forming agents.

The method according to the invention is especially suited in the operation of gas diffusion cathodes in which oxygen is used as the oxidizing gas and in the operation of gas diffusion anodes in which hydrogen is used as the reducing gas.

DESCRIPTION OF THE DRAWINGS

A more complete and detailed understanding of the present invention and its objectives may be obtained by the careful study of the following detailed description in combination with the drawings where like reference numerals refer to like parts throughout the drawings, all of which form a part of this invention in which.

DETAILED DESCRIPTION OF THE PREFERRED EMBODIMENTS OF THE PRESENT INVENTION

Figure 1:
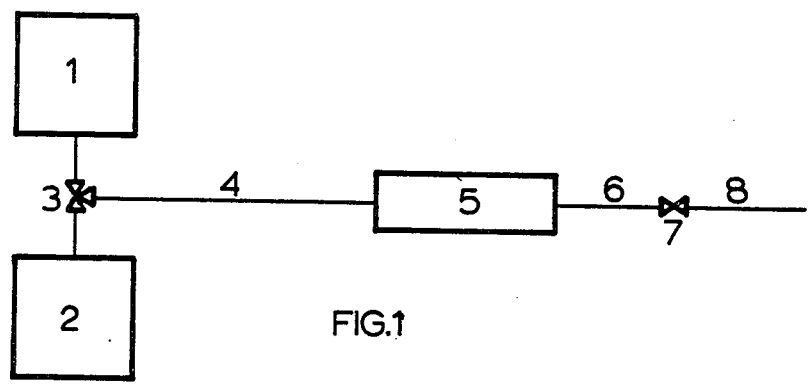
FIG. 1 diagrammatically shows one arrangement of elements used to control the operation of a fuel cell where two gas chambers are employed so that a plurality of supplied of reducing or oxidizing gases are available at different concentration levels.

Turning now to the FIG. 1, gas is held in chambers 1 and 2 the same substantially constant pressure p and one of the two gas chambers may communicate with ambient air when oxidizing gas is supplied. Gas chamber 1 contains gas with a mol% oxidizing or reducing gas and gas chamber 2 gas with b mol% oxidizing or reducing gas, both calculated as molecular oxygen or hydrogen, where b is smaller than a.

Gas flows from gas chamber 1 via three-way valve 3 and gas supply line 4 to the porous gas diffusion electrode in question of fuel cell 5. Spent gas from the electrode is discharged from the cell via gas discharge line 6-8 which includes a shutoff valve 7.

Once polarization of the electrode has exceeded a certain limit or after the lapse of a certain predetermined period of time, three-way valve 3 is switched so that gas starts to flow from gas chamber 2 to the porous gas diffusion electrode, with power still being taken from the fuel cell. Owing to the continuing power offtake the oxidizing or reducing gas present in the gas phase in situ of this electrode is further spent and discharged. Thus, the concentration of the oxidizing or reducing gas in the gas phase in situ of the electrode drops to a lower level. Restoring the former operating condition is effected by switching three-way valve 3 back to its original position.

With the arrangement shown in FIG. 1, the fuel cell can be put out of service for a prolonged period in a very suitable manner.

To this end gas chamber 2 can be filled with a gas that is inert under the reaction conditions and does not contain oxidizing or reducing gas. A very suitable inert gas for this purpose is nitrogen. The pressure in gas chamber 2 is again substantially constant and equal to that in gas chamber 1.

Three-way valve 3 is switched so that pure inert gas flows from gas chamber 2 to the porous gas diffusion electrode in question with power offtake being continued. As power offtake continues, the oxidizing or reducing gas present in the gas phase in situ of this electrode is spent and discharged and replaced by inert gas.

Thus, a very low concentration of the oxidizing or reducing gas in the gas phase in situ of the electrode can be reached. After some time valve 7 is shut and the power usage is interrupted. If so desired, the power offtake can proceed until power generation comes to a standstill. The fuel cell can now be stored for a prolonged period and yet be taken into service at any time without any problem.

Figure 2:
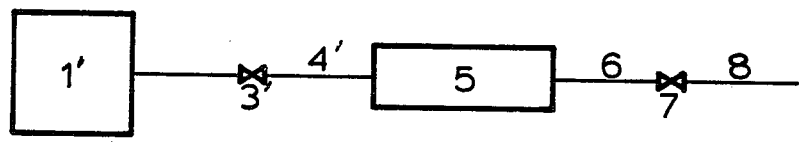
FIG. 2 diagrammatically shows an alternative arrangement of elements used to control the operation of a fuel cell.

Turning next to FIG. 2, another arrangement employing only one source of feed gas from chamber 1' for the electrode under all circumstances is illustrated. In gas chamber 1' a substantially constant pressure g is provided. If so desired, this gas chamber 1' can communicate with ambient air in the course of supplying oxidizing gas. The gas chamber contains gas with c mol% oxidizing or reducing gas, calculated as molecular oxygen or hydrogen respectively.

From gas chamber 1' gas flows via valve 3' and gas supply line 4' to the porous gas diffusion electrode in question of fuel cell 5. Spent gas from the electrode is again discharged from the cell via gas discharge line 6-8 and valve 7.

Once polarization of the electrode has passed a certain limit or after a given period of time has elapsed, valve 7 is fully or partially closed, power offtake being carried on. By the continuing power offtake, the oxidizing or reducing gas present in the gas phase in situ of this electrode is spent and, as the case may be, discharged, as a result of which the concentration of the oxidizing or reducing gas in the gas phase in situ of the electrode drops to a lower level. Restoring to the former service condition is done by switching valve 7 back to its original position. Preferably the last of these methods is at one given moment applied with either the cathode or the anode alone.

The present invention is further elucidated by the following examples, without being restricted thereto.

EXAMPLE 1

A hydrogen-air fuel cell was supplying a current of a density of 1000 A/m$^2$ at a corresponding terminal voltage of 0.69 Volts. The terminal voltage decreased with time to a value of 0.65 Volts.

The air stream over the cathode was replaced by an argon stream, the anode and cathode remaining short-circuited across a resistor. After 15 minutes, the original situation was restored. The terminal voltage at 1000 A/m$^2$ was again 0.69 Volts.

EXAMPLE 2

A fuel cell was supplying power across a fixed resistor of 0.1 Ohm. Initially the power output amounted to 302 W. The cathodes of the fuel cell were fed with air at a constant rate of 1400 Nl/hour. The anodes were fed with hydrogen at a constant rate of 300 Nl/hour. After a certain lapse of time, the power output had decreased to 256 W.

The air discharge of the battery was then closed for five minutes. As a result the current dropped to substantially zero amperes. When the air discharge was subsequently opened again, the battery resumed its supply of power within seconds. The power output across the resistor then amounted to 301 W.

EXAMPLE 3

A hydrogen-air fuel cell battery with phosphoric acid electrolyte was fed at 175° C. with hydrogen containing 2 percent by volume of CO. The anode contained a noble-metal-on-carbon catalyst. In a few days time the voltage at which 800 A/m$^2$ could be supplied had decreased by 86 mV per unit.

The hydrogen stream was replaced by a nitrogen stream, the battery being kept under load. The terminal voltage of the battery dropped to about 0.01 volt per cell unit and the current density decreased to substantially 0 A/m$^2$. After 15 minutes the nitrogen stream was again replaced by a hydrogen stream. By this treatment, the battery voltage was so improved that the original voltage level at which 800 A/m$^2$ could be supplied was reached again but for 1 mV per cell unit.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What is claimed is:

1. A method for operating a fuel cell with a porous gas diffusion electrode to which an oxidizing or reducing gas is fed, wherein the concentration level of the oxidizing or reducing gas, calculated as molecular oxygen or hydrogen respectively, in the gas phase in situ of the electrode in question is temporarily brought to a reduced level the terminal voltage being reduced to below 10% of its original value, the overall pressure of the gas phase in situ of this electrode being substantially maintained and the power offtake is continued for at least the period during which the concentration level is reduced.

2. A method according to claim 1 wherein the porous gas diffusion electrode is regularly regenerated by maintaining the concentration of the oxidizing or reducing gas in the gas phase in situ of the electrode at given intervals and for a given time at the said reduced level.

3. A method according to claim 2 wherein during operation of the fuel cell the step of reducing the concentration level occurs for a period of time ranging from about 1 to about 30 minutes every 10–200 hours.

4. A method according to claim 1 wherein the fuel cell becomes shut down.

5. A method according to any of claims 1–4 wherein the concentration of the oxidizing or reducing gas in the gas phase in situ of the said electrode is decreased by replacing the normal feed gas by a feed gas with a reduced concentration level of the oxidizing or reducing gas.

6. A method according to claim 5 wherein the feed gas having the reduced concentration level is a gas that is inert under the conditions of the reaction.

7. A method according to claim 6 wherein the inert gas is nitrogen.

8. A method according to any of claims 1–3 wherein the resistance of the gas discharge line on the cathode or anode side of the fuel cell is increased without at least proportionally increasing the resistance of the gas feed line in question, the composition of the gas feed not substantially being changed.

9. A method according to any of claims 1, 2 or 3, wherein the electrode is comprised of a flat gas diffusion electrode including at least a catalytically active layer containing a catalytically active metal, carbon and a polymeric bonding agent and is porous to gas and the electrolyte.

10. A method according to claim 1 where operation is as a gas diffusion cathode wherein the oxidizing gas comprises oxygen.

11. A method according to claim 10 wherein air is employed as the normal feed gas.

12. A method according to claim 1 wherein the operation is as a gas diffusion anode with the reducing gas comprising hydrogen.

* * * * *